2 Sheets--Sheet 1.

J. H. GARNHART.
Binders' Attachments for Harvesters.

No. 142,331. Patented September 2, 1873.

Witnesses.
C. F. Brown.
Melville Church.

Inventor.
J. H. Garnhart.
by his Attys.
Hill & Ellsworth.

J. H. GARNHART.
Binders' Attachments for Harvesters.
No. 142,331.
2 Sheets--Sheet 2.
Patented September 2, 1873.
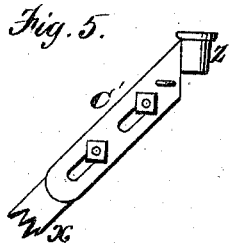
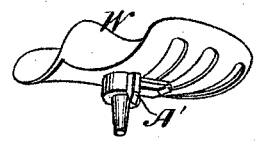
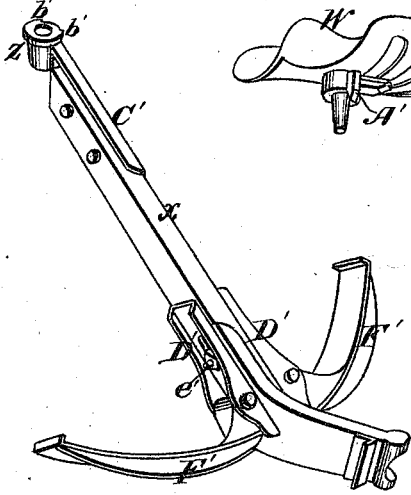
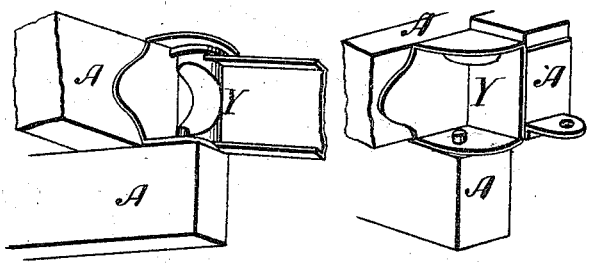
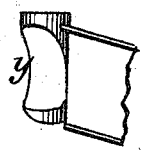
WITNESSES.
INVENTOR
J. H. Garnhart
By
His Attorneys.

UNITED STATES PATENT OFFICE.

JOHN H. GARNHART, OF MADISON, WISCONSIN.

IMPROVEMENT IN BINDERS' ATTACHMENTS FOR HARVESTERS.

Specification forming part of Letters Patent No. 142,331, dated September 2, 1873; application filed January 11, 1873.

*To all whom it may concern:*

Be it known that I, JOHN H. GARNHART, of Madison, in the county of Dane and State of Wisconsin, have invented certain new and useful Improvements in Grain-Harvesters; and I do hereby declare the following to be a full, clear, and exact description of the same, reference being had to the accompanying drawings forming part of this specification, in which—

Figure 1:
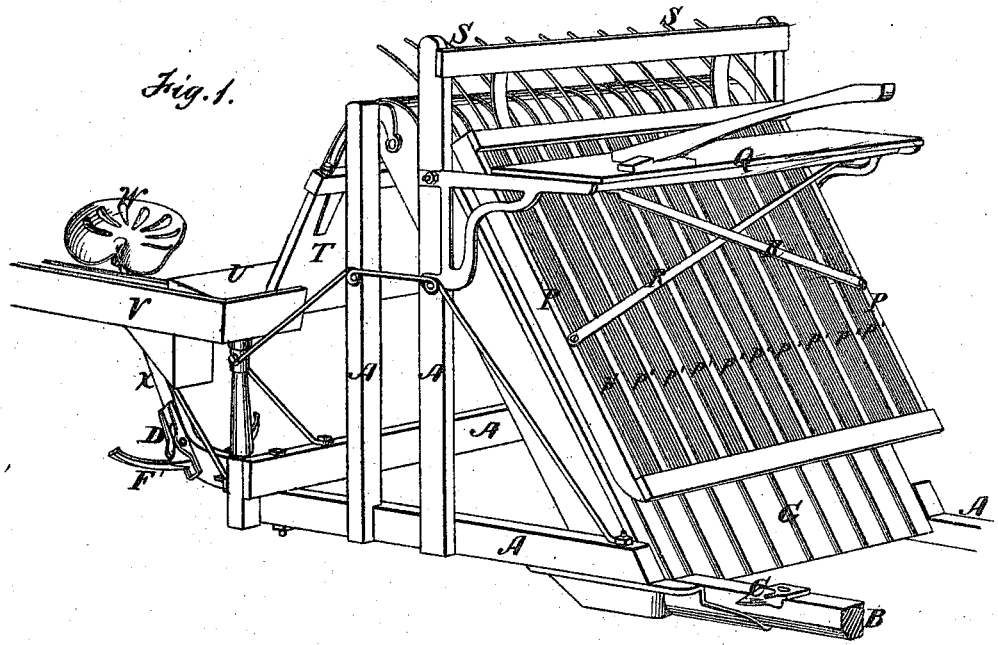
Figure 2:
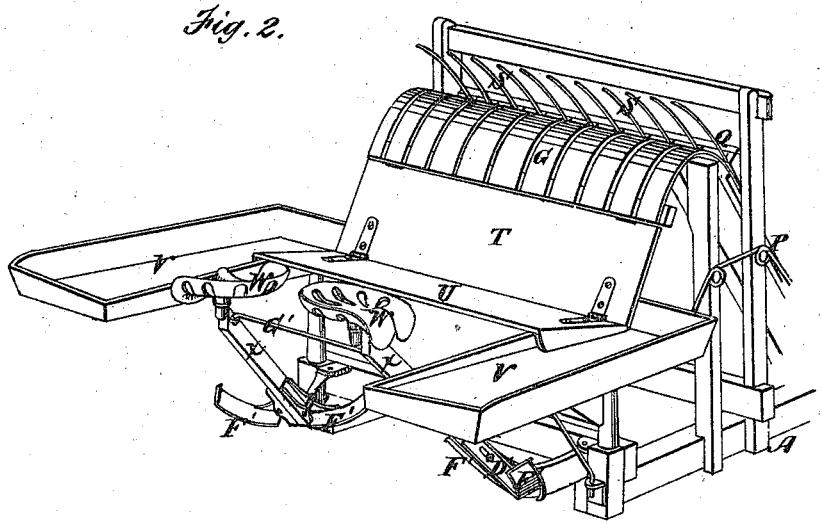

Figure 1, Sheet 1, is a perspective view of a harvester containing my improvements, looking obliquely from the front toward the elevator-platform. Fig. 2, Sheet 1, is a perspective view of the same, looking obliquely from the front toward the grain-receptacle, binders' tables, and binders' seats. Fig. 3, Sheet 2, is a perspective view of one of the seat-standards. Fig. 4, Sheet 2, is a perspective view of a seat detached from its standard. Fig. 5, Sheet 2, is an elevation showing the upper end of a seat-standard. Fig. 6, Sheet 2, shows the method of pivoting the seat-standards to the frame of the machine.

Similar letters of reference in the accompanying drawings denote the same parts.

My invention has for its object to improve that class of harvesters which are provided with endless rake-aprons to receive the cut grain and deposit it in a grain-receptacle near the binders' tables, to be bound by hand and discharged from the machine. To this end the invention consists, first, in the employment of a grain-receptacle made of two or more pieces hinged together and to the frame of the machine, by means of which construction the receptacle may be so folded out of the way as to afford easy access to the interior for the purpose of raising and lowering the machine for oiling the parts, or for similar objects; second, in the employment of adjustable binders' seats, the standards of which are adjustably pivoted to the frame of the machine, so that the position of the binder with regard to his distance from the binders' table may be varied at pleasure, and so that the seats may be turned in close to the machine when passing through gates, &c.; third, in pivoting the binders' seats to their standards, so as to allow the binder to turn from the grain-receiver to his table, to bind a bundle more readily and with less strain and fatigue; fourth, in adapting the binder's seat for vertical adjustment upon its standard; fifth, in so connecting the standards of the binders' seats, by rods or otherwise, that the binders will be always kept apart and not interfere with each other in the operation of binding; and lastly, in the construction and combination of various parts, as I will now proceed to describe.

In the accompanying drawings, A is the frame of the elevator, to which the finger-bar B is attached, and C C are the fingers or guards, secured in the ordinary manner to the finger-bar. The fingers are beveled off along their sides $d$, next the standing grain, while their opposite faces $e$ are straight, thereby enabling the grain to fall obliquely upon the rake-apron F, which moves over the platform and conveys the grain to the elevator G. W W are the binders' seats, and X X their standards, which are pivoted at their inner ends to the frame of the machine, as shown at $y\, y$. This adjustment is designed to regulate the distance of a binder from his table, so that he may perform his work to the best advantage. The seats are pivoted to the standards by a bolt on the under side of each seat passing through an eye, $z$, on the outer end of each standard. This connection allows a binder to turn his seat horizontally into such positions as shall enable him to do his work with the least fatigue or strain. If desired, the seat-standards may be permanently secured to the frame. The seats are placed above the level of the binders' tables, such being the position best calculated to afford the binders the greatest facilities for the performance of their labors with the least effort. A' is a pin projecting from the under side of each seat, so as to extend beside the eye Z, which is cut out slightly to receive it between the shoulders $b'\, b'$, as shown. By this provision the rotation of the seats is limited to a greater or less degree, according to the distance between the shoulders $b'$; and the arrangement is such that each seat shall be stopped as it fronts the binder's table, thereby forming a steady support for the binder while at work. The eye Z is formed upon a slotted plate, C', attached to the outer end of the seat-standard by bolts passing through slots and provided with nuts on their inner ends. By this construction the plates are adapted for longitudinal adjustment for the purpose of adjusting the height of the seats with respect to the binders' tables. It will thus be seen that the binders' seats have a vertical adjustment as well as the two horizontal adjustments. D' D' are slotted sockets attached to the inner ends of the seat-standards by bolts e' passing through the slots, and F' are stirrups or foot-rests, pivoted at their inner ends to the sockets. These stirrups serve as foot-rests for the binder and enable him to more securely retain his position in the seat as the machine moves over the field, and to brace him in the seat, so that he can bind with more facility and ease. The vertical adjustment of the stirrups allows of their use by binders with different lengths of legs. G' is a rod connecting the standards of the seats, for the purpose of keeping the binders separate, so that they shall not jostle each other in the performance of their work by being thrown together when the machine is in motion.

Having thus described my invention, what I claim is—

1. A grain-receiver made of two or more parts hinged to each other and to the elevator-frame, substantially as described, for the purpose specified.

2. A grain-receiver composed of two or more parts hinged together, the lower one of which is arranged to rest at each end upon the binders' tables, substantially as described, for the purpose specified.

3. A binder's seat, the inner end of whose standard is pivoted to the frame of the machine so as to swing laterally upon its pivot, to vary the distance horizontally of the binder's seat from the binder's table, substantially as described, for the purpose specified.

4. A swinging binder's seat pivoted to the outer end of its adjustable standard, substantially as described, for the purpose specified.

5. In combination with the pivoted binder's seat, the stop A' and the shoulders b' upon the eye Z, so that the binder's seat shall turn or swing upon its standard and be stopped as it fronts the binder's table, substantially as described, for the purpose specified.

6. The adjustable slotted plate C', constructed with an eye, Z, as a means of connecting the binder's seat and its standard, substantially as described, for the purpose specified.

7. The binders' seats, having their pivoted swinging standards connected to each other above the pivotal points, by means of a detachable rod, substantially as described, for the purpose specified.

8. Hinged or pivoted stirrups or foot-rests on the seat-standards, substantially as described.

9. Hinged or pivoted stirrups or foot-rests made adjustable on the seat-standards, substantially as described, for the purpose specified.

10. The binders' seats, pivoted to the outer ends of their standards, made vertically and horizontally adjustable, and combined with the adjustable stirrups or foot-rests, substantially as described, for the purposes specified.

JOHN H. GARNHART.

Witnesses:
  WILLIAM HABICH,
  W. H. BEEKMAN.